(12) United States Patent
Donabedian et al.

(10) Patent No.: US 9,365,245 B2
(45) Date of Patent: Jun. 14, 2016

(54) LOAD MANAGEMENT DEVICE

(71) Applicant: Ford Global Technologies, LLC, Dearborn, MI (US)

(72) Inventors: Edgar Edward Donabedian, Livonia, MI (US); Fungtai Charles Ko, Novi, MI (US); Leonard Anthony Shaner, New Balitmore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/529,329

(22) Filed: Oct. 31, 2014

(65) Prior Publication Data

US 2015/0130224 A1    May 14, 2015

Related U.S. Application Data

(60) Provisional application No. 61/901,568, filed on Nov. 8, 2013.

(51) Int. Cl.
*B62D 25/16* (2006.01)
*B62D 25/04* (2006.01)

(52) U.S. Cl.
CPC ............... *B62D 25/16* (2013.01); *B62D 25/04* (2013.01)

(58) Field of Classification Search
CPC ............ B60R 19/24; B60R 2019/1886; B60R 2019/247; B62D 25/16
USPC .................................. 296/187.06, 193.06, 198
See application file for complete search history.

(56) References Cited

U.S. PATENT DOCUMENTS

| | | | |
|---|---|---|---|
| 6,296,298 B1 | 10/2001 | Barz | |
| 6,364,358 B1* | 4/2002 | Miller | ........................ 280/784 |
| 7,540,550 B1* | 6/2009 | Huber | .................... B60R 19/24 |
| | | | 293/120 |
| 8,430,448 B2 | 4/2013 | Richardson et al. | |
| 8,641,131 B2* | 2/2014 | Honda et al. | ............. 296/187.12 |
| 8,672,383 B2* | 3/2014 | Crane | .................. B62D 25/163 |
| | | | 296/146.11 |
| 8,801,079 B2* | 8/2014 | Shantz et al. | ............ 296/187.02 |
| 2013/0241240 A1* | 9/2013 | Tokumoto et al. | ....... 296/193.08 |
| 2015/0048650 A1* | 2/2015 | Gupta et al. | ............... 296/187.1 |

* cited by examiner

*Primary Examiner* — Pinel Romain
(74) *Attorney, Agent, or Firm* — Jason C. Rogers; Bejin Bieneman PLC

(57) ABSTRACT

A bracket for protecting a flange of a body of a vehicle includes a first portion, a second portion, and a channel defined between the first and second portions. The channel receives the flange. The bracket includes a back side and adhesive disposed on the back side. A front side of the bracket is disposed opposite the back side. A transition surface on the front side slopes inwardly from the first portion to the second portion for deflecting a wheel away from the flange during an offset impact.

18 Claims, 8 Drawing Sheets

LOAD MANAGEMENT DEVICE

CROSS-REFERENCE TO RELATED APPLICATIONS

Figure 1:
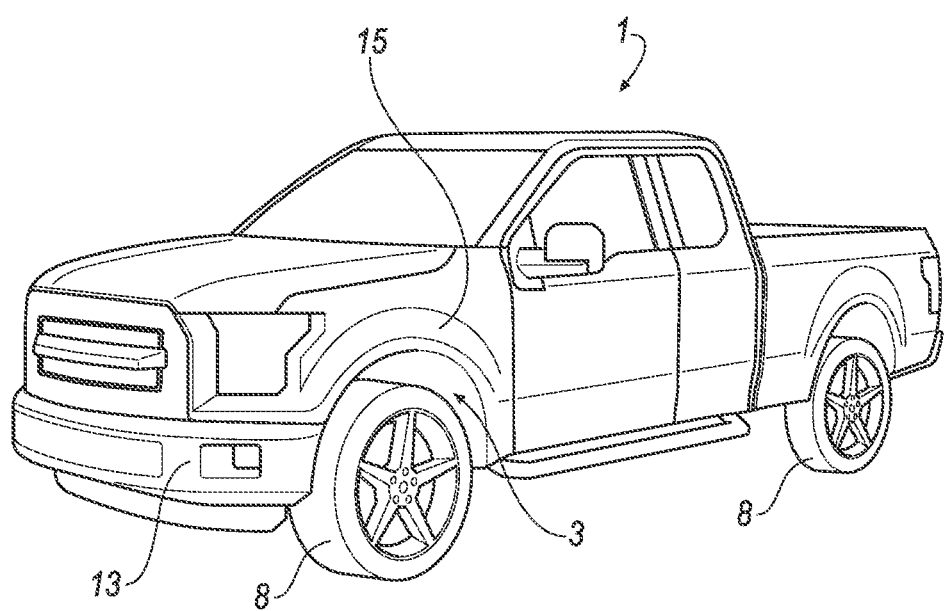

The subject patent application claims priority to and all the benefits of U.S. Provisional Patent Application No. 61/901,568 filed on Nov. 8, 2013, which is herein incorporated by reference in its entirety.

BACKGROUND

It is generally known to provide a vehicle including a vehicle frame assembly of any known or appropriate type, such as a unitary body or a cab on frame assembly. It is also generally known to provide a vehicle including various structures for improving the performance of the vehicle during a variety of types of impacts to the vehicle. The performance of a vehicle and its various structures, assemblies, and components from an impact may be assessed using a variety of crash tests and analytical methodologies.

A frontal crash test having a relatively small amount of overlap may be designed to attempt to replicate what may happen when only a relatively small portion of the front corner of a vehicle collides with another object like a vehicle, tree, utility pole or the like. One known industry test is the small overlap rigid barrier (SORB) test. In the SORB test, a vehicle travels at 40 mph toward a 5-foot-tall rigid barrier and only the outer 25% of the vehicle width is impacted into the barrier. It is generally understood that most modern vehicles may be designed to have safety cages and other structures, assemblies and components for protecting the occupant compartment and built to help manage energy with controlled and limited deformation to the vehicle during a variety of impacts to the vehicle from most direction, including a head-on and overlap frontal crashes. The crush zones of the main body and frame structures are designed to manage the crash energy to reduce forces on the occupant compartment and its occupants. When a crash involves these structures, the occupant compartment may generally be protected from intrusion, and the airbags and safety restraints may perform to restrain vehicle occupants.

Small overlap frontal crashes primarily affect a vehicle's outer edges, which may not be directly protected by the some of the primary crush-zone structures. In such a scenario, crash forces may go directly into the front wheel, suspension system and potentially the vehicle bulkhead and cab including the passenger compartment. In a small overlap crash that does not engage the main structures of the vehicle, it may be possible for the wheel to be forced rearward toward the passenger compartment and the door hinge pillar of the cab of the vehicle. The wheel may even be trapped and forced into the body structure where local loads that may surpass the strength of the steel or aluminum structures and couplings.

There remains a continuing and significant need to provide improved impact or crush performance structures having a lower cost structure and an improved performance in a greater number of scenarios. In particular, there remains a continuing and significant need to provide an improved impact performance of a vehicle that will include reducing intrusion of the forward structures of the vehicle into the cab or occupant compartment of the vehicle.

DRAWINGS

Figure 2:
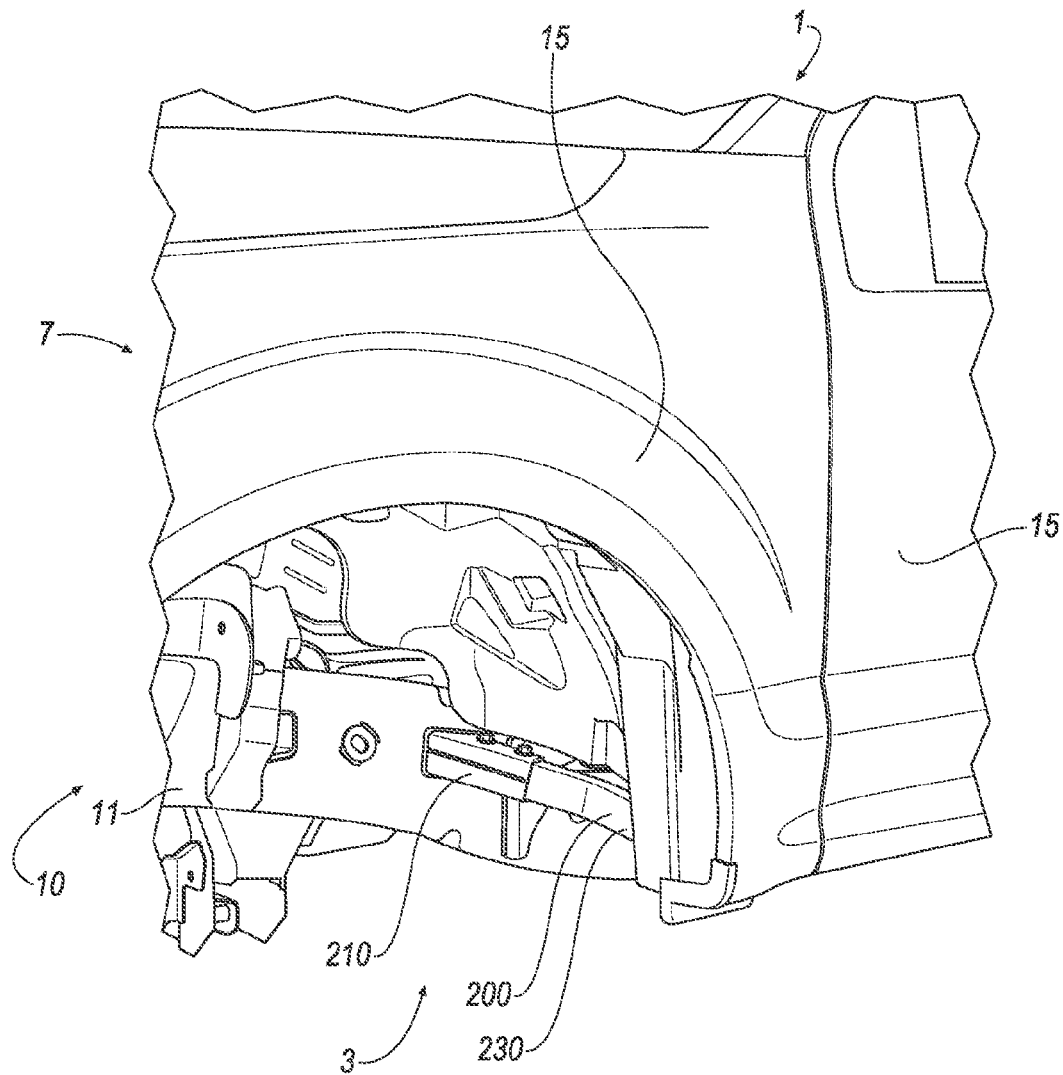
Figure 3:
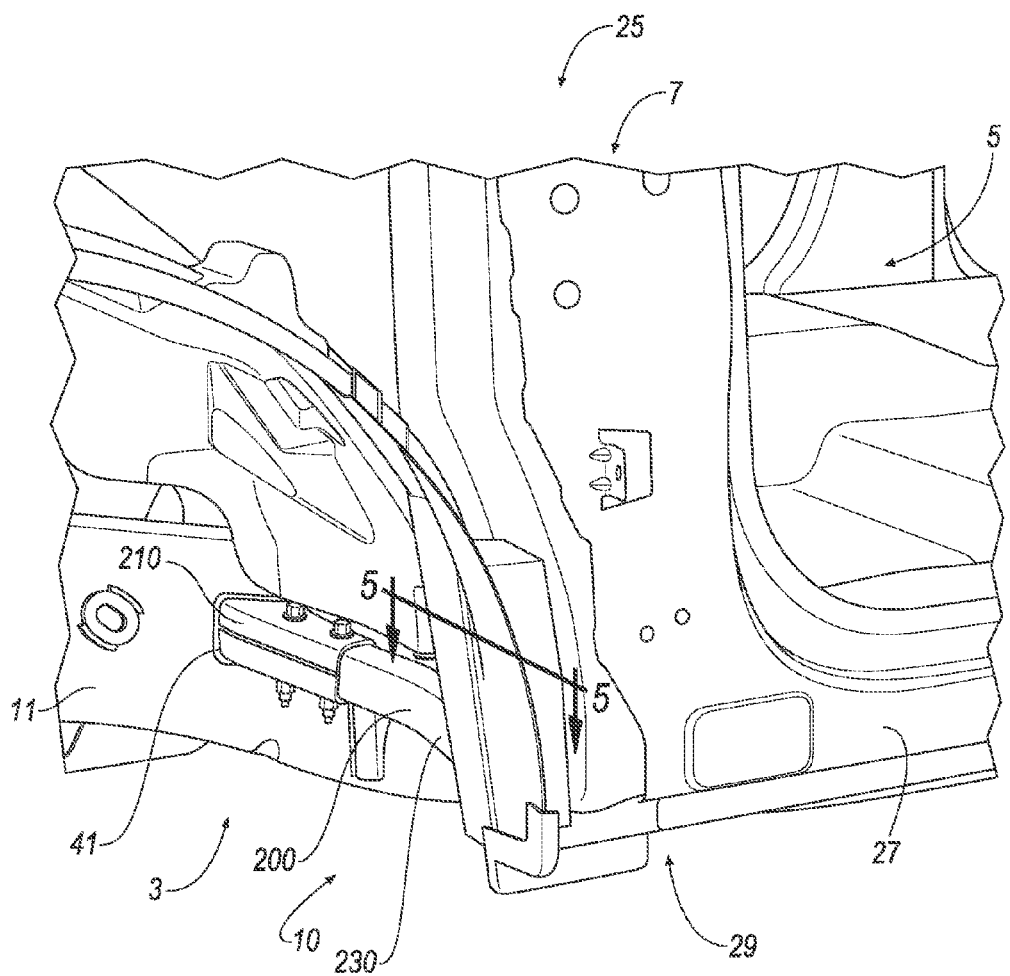
Figure 4:
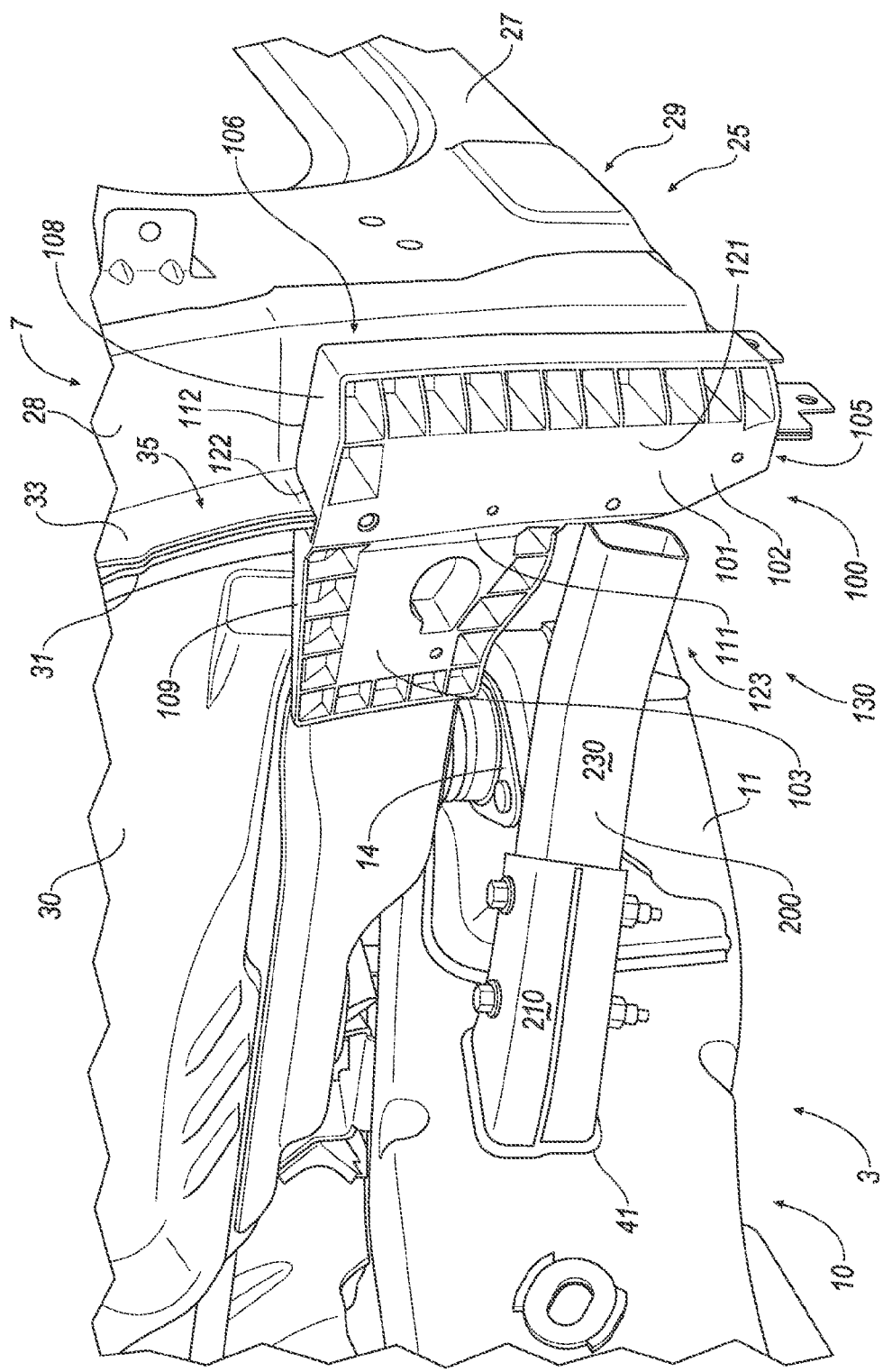
Figure 5:
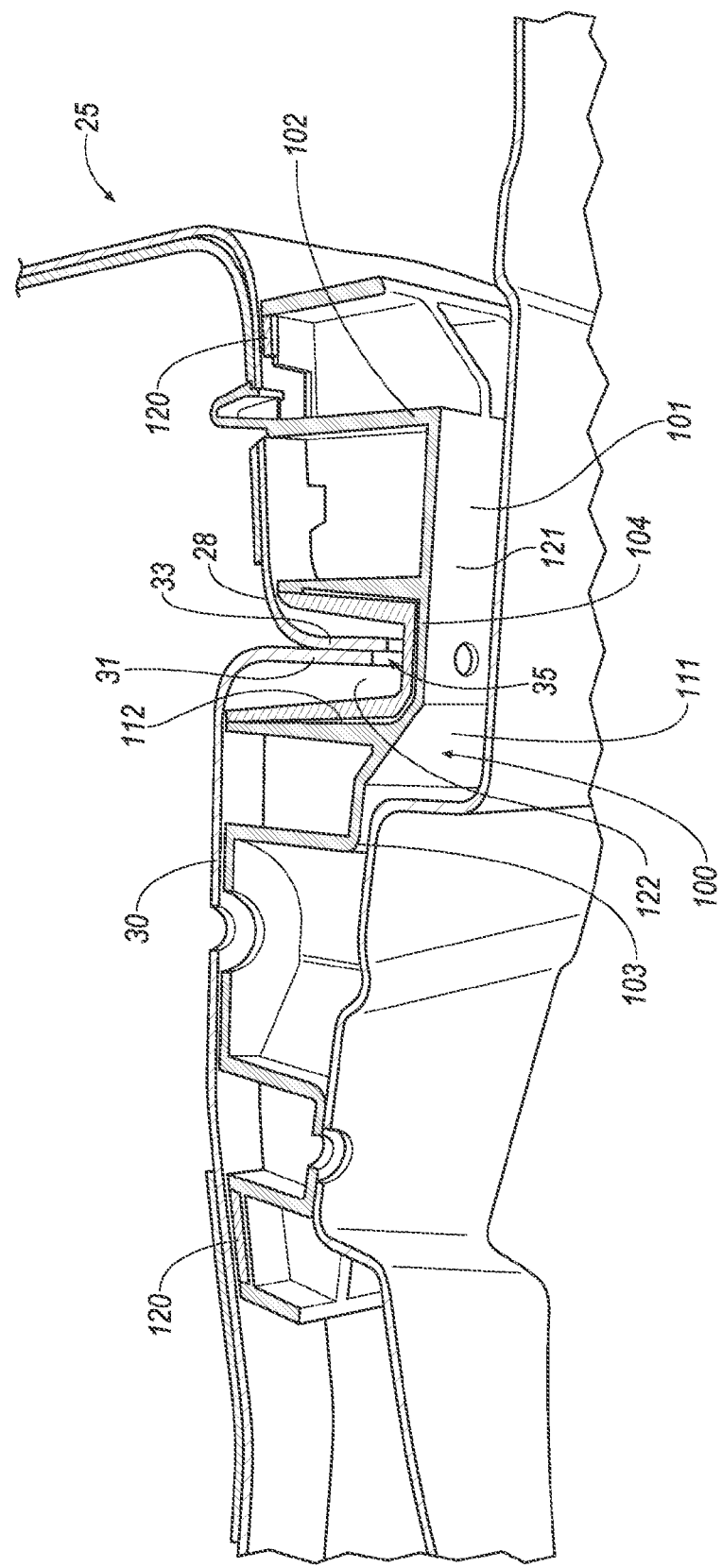
Figure 6:
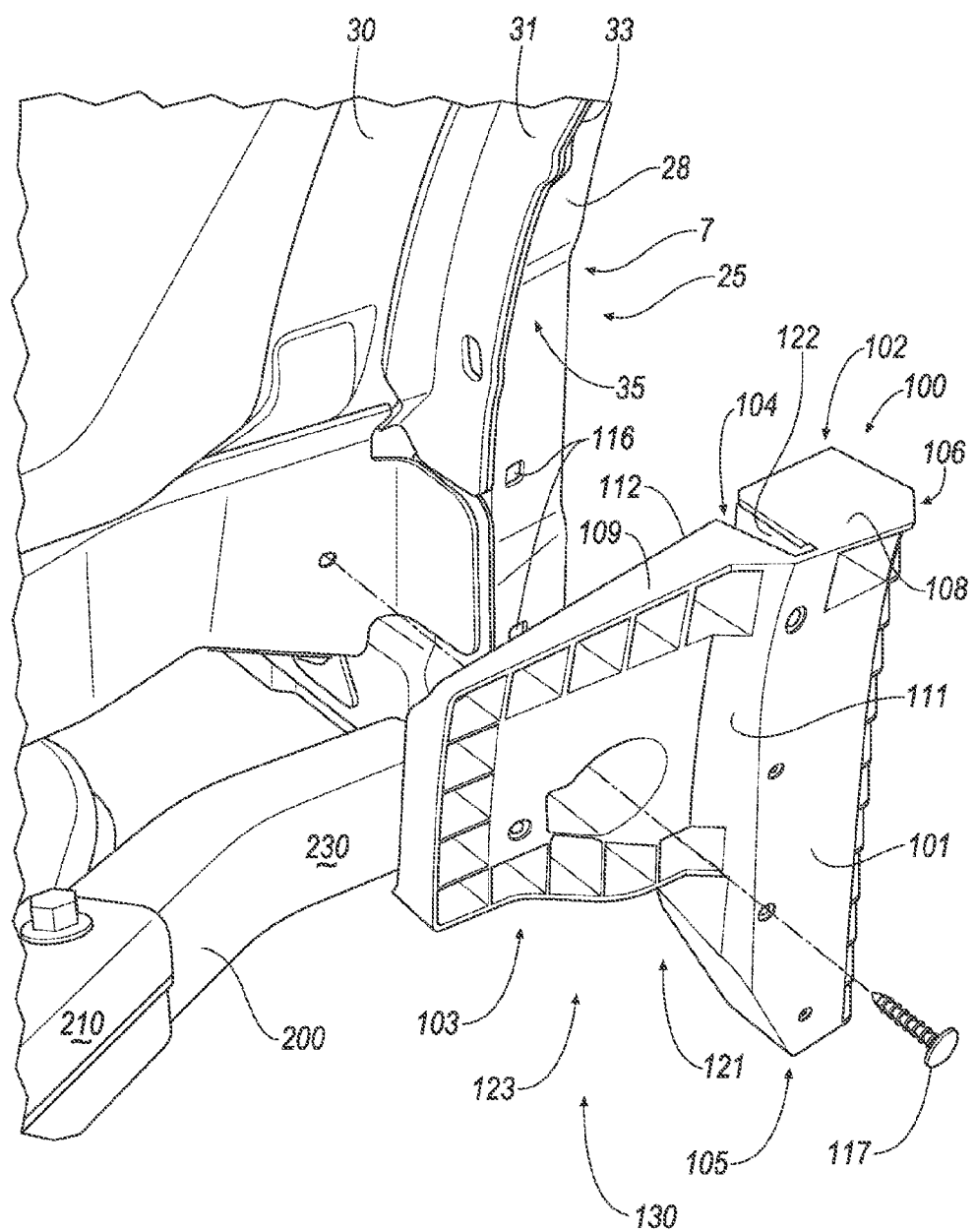
Figure 7:
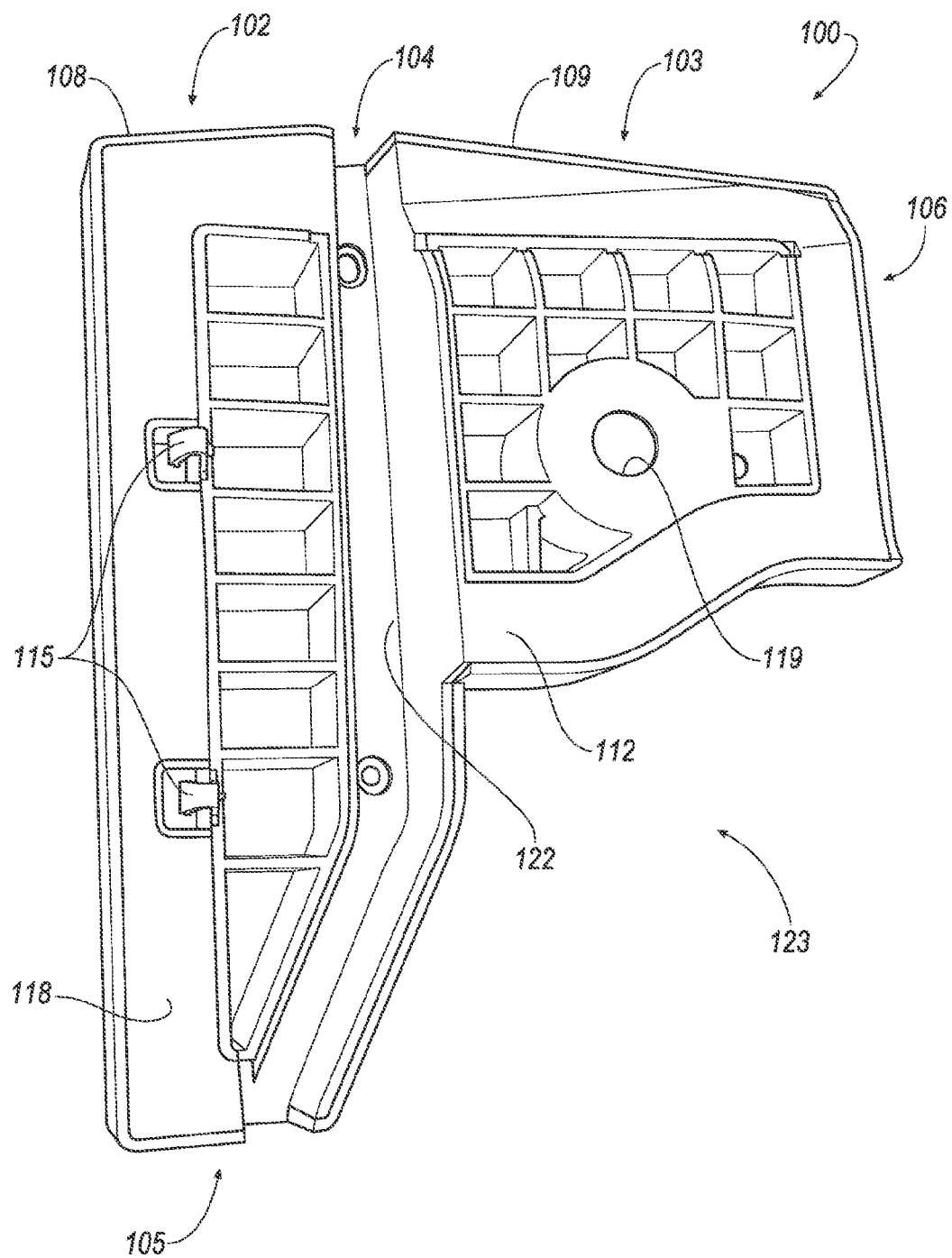
Figure 8:
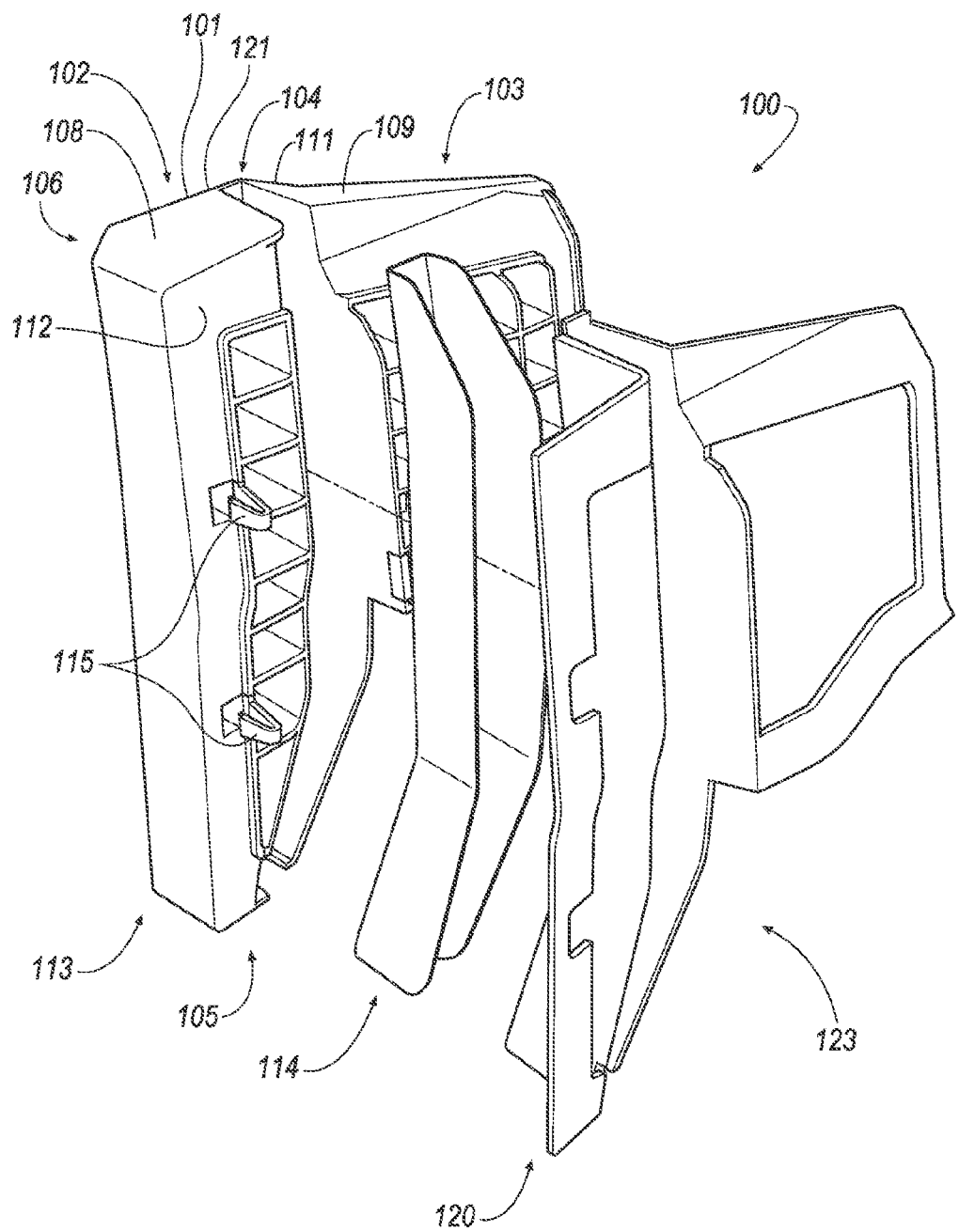

FIG. 1 is a perspective view of a vehicle;
FIG. 2 is a perspective view of a front portion of the vehicle at the wheel well, with the wheel removed for illustrative purposes, and showing a rear blocker extending from a frame of the vehicle;
FIG. 3 is a perspective view of the vehicle of FIG. 2 with outer body panels of the vehicle removed;
FIG. 4 is a perspective view of a portion of the vehicle of FIG. 2 with a wheel well covering removed to show a bracket mounted to a flange of the vehicle body;
FIG. 5 is a cross-section through line 5-5 of FIG. 3;
FIG. 6 is a perspective view of a portion of the vehicle including the bracket exploded from the flange of the vehicle body;
FIG. 7 is a perspective view of a body of the bracket; and
FIG. 8 is an exploded view of the bracket.

DETAILED DESCRIPTION

To meet certain current and future safety requirements for vehicles, automotive manufacturers are challenged to design vehicle structures using understood and predictable methods and materials. In particular, this includes vehicle structures made from steel and/or aluminum and coupled or joined using any understood joining technique for creating a structure capable of withstanding greater frontal impact loads while maintaining and/or improving vehicle performance. One applicable test is the Small Offset Rigid Barrier (SORB) testing, where the most central vehicle structures do not interface with the testing platen. As a result of an offset frontal impact and SORB load inputs, the outward or distal vehicle body may be exposed to higher load impacts.

Referring in general to all of the Figures, and in particular to FIGS. 1 and 2, an exemplary embodiment of a vehicle 1 is shown. The vehicle 1 includes a vehicle body assembly 130 including a vehicle body 7 and a bracket 100 on the vehicle body 7, as discussed further below. The vehicle 1 may include a wheels 8 providing mobility to the vehicle 1 as is well understood. The wheels 8 may have any known or appropriate construction and may include a tire mounted on a rim (not numbered). The vehicle 1 may include a vehicle frame 10 and the cab 7, also referred to as a body, as best shown in FIG. 1. The vehicle 1 may have a unibody frame construction, such as may be known for use in a sedan or crossover type vehicle, but may alternatively have a cab-on-frame or other type of vehicle frame construction. In one particular exemplary embodiment, the vehicle 1 may be entirely made from an aluminum material. In one exemplary embodiment, body-in-white (BIW) structures 25 of the vehicle 1 may be composed of frame members of the frame 10 made from an aluminum or aluminum alloy material. In one particular exemplary embodiment, the BIW frame structures 25 of the vehicle 1 may be composed of frame members of the frame 10 made from only aluminum or aluminum alloy materials.

The vehicle 1 may further include a front bumper 13 or impact absorber located at the car forward end of the vehicle 1. Referring now with a particular focus on FIG. 4, the vehicle frame 10 may include frame rails 11, also referred to as beams or members, as may be generally known for a cab on frame type vehicle. The frame rail 11 shown in the Figures is a left-side frame rail, and it should be appreciated that the vehicle frame 10 also includes a right-side frame rail (not shown) similar to the left-side frame rail. It should be noted that the frame rail 11 generally extends in a direction aligned with the car forward direction of vehicle 1. The vehicle frame 10 and its various components may preferably be made from a high strength and/or ultra-high strength steel and may be coupled together using known or appropriate fastening or coupling structure or process, including in one particular exemplary embodiment, a metal inert gas (MIG) welding process.

The vehicle frame 10 may further include a plurality of cross members (not shown) for coupling the frame rails 11. The cross members extend generally, longitudinally in the cross-car direction and may be coupled or welded to the frame rails 11 using any known or appropriate structure or process. The vehicle frame 10 may further include cab mount brackets 14 coupled to the frame rails 11. Each of the cab mount brackets 14 may include a passage or hole (not shown) for receiving a post or other extension member for coupling or securing the body 7 to the vehicle frame 10 as part of manufacturing the vehicle 1. The vehicle frame 10 may further include shock tower brackets (not shown), e.g., left-side and right-side shock tower brackets, located proximal the wheels 8 and between frame rails 11 for receiving a post or other extension member of the body 7 for coupling the body 7 to the vehicle frame 10.

In one exemplary embodiment, the vehicle frame 10 may include front blocker structures (not shown) on each frame rail 11, and rear blockers 200 coupled to each frame rail 11. The details of the front blocker structure and rear blocker 200 are best understood from the disclosure of the U.S. patent application Ser. No. 13/966,790, filed Aug. 14, 2013, entitled, VEHICLE FRAME COMPONENT, in the name of Gupta et al., the entire contents of which is incorporated herein by reference for all purposes. The rear blocker 200 is coupled to the frame rail 11 at a location rearward and proximal the wheel 8 and the wheel well 3. The frame rail 11 includes a first hole or passage 41 for coupling the rear blocker 200 to the frame rail 11. The rear blocker 200 is located in and extends through the first passage 41 and may be coupled or welded to the frame rail 11. A bracket 100, as discussed further below, extends in a direction substantially aligned with the cross car direction (which is normal or perpendicular to the car forward direction) and generally in a direction outward from the frame rail 11 such that in a small offset frontal impact (including where the offset frontal impact is to less than 25% of the vehicle width), the rear blocker 200 will be impacted by the wheel being driven rearward in the wheel well 3 and toward the body 7. Only one bracket 100, in particular on the left side of the vehicle 1, is shown in the Figures, however, it should be appreciated that a bracket 100 is also disposed on the right side of the vehicle 1 and is a mirror image of the bracket 100 shown in the Figures.

Referring now in particular to FIG. 3, outer panels 15 of the vehicle 1 are removed to show a body-in-white ("BIW") frame structure 25 of the body 7 further defining the passenger compartment 5. The body 7 may include a rocker 27, also referred to as a lower sill, which is part of the BIW frame structure 25. The BIW frame structure 25 of the body 7 may further include a hinge pillar 28 coupled at a forward end 29 of the rocker 27. The hinge pillar 28 may extend upward from the rocker 27 and may be coupled to a bulkhead 30, which may also referred to as a firewall, at an end 31 of the bulkhead 30. The vehicle body 7 presents a flange 35. Specifically, the hinge pillar 28 and the bulkhead 30 of the body 7 present the flange 35. The hinge pillar 28 may further include an end 33 that may be coupled to the end 31 of the bulkhead 30. In one particular exemplary embodiment, as best shown in FIGS. 4-6, the ends 31 and 33 of the hinge pillar 28 and bulkhead 30, respectively, located on the forward-facing (i.e., car forward direction) surface of the wheel well 3, may form the flange 35, also referred to as a pinch flange, seam, extension, or lip, that faces forwardly. In one particular exemplary embodiment of the present disclosure, the BIW frame structure 25 and all of its components are preferably produced using an aluminum material. Accordingly, the components of the BIW frame structure 25, including the hinge pillar 28 and the bulkhead 30 may be coupled or joined together using rivets or similar joining structures.

In one exemplary embodiment according to the present disclosure, the bracket 100, also referred to as a body patch, may be applied to the body 7, e.g., the BIW frame structure 25, to manage and distribute impact loads, including those generated during a SORB test and to protect the flange 35 of the body 7. The bracket 100 according to the exemplary embodiments of the present disclosure is capable of addressing force management issues during a small offset frontal impact and may be designed in a weight and package-efficient embodiment providing overall improved performance at a highly competitive overall cost, complexity, tooling, assembly, and weight advantage. Further, the bracket 100 according to the exemplary embodiments of the present disclosure has particular utility in conjunction with the rear blocker 200 for managing the loads associated with the wheel 8 of the vehicle 1 during a small offset frontal impact.

In one exemplary embodiment of the present disclosure, the bracket 100 according to the present disclosure functions to better address the key elements of the load inputs primarily induced through the front wheel 8 during a frontal impact, including, in particular, during barrier SORB test. The body 113 may be formed by injection molding, or any other suitable method of manufacture. The body 113 may be formed of plastic, such as nylon, or any other suitable method of manufacture. The body 113 of the bracket 100 according to the present disclosure may be designed as a molded device to better manage and distribute the impact loads from the wheel 8 by providing a primary exterior surface 101 that is generally smooth and free of undulations or disruptions as best shown in Figures.

To help limit and/or avoid embedding the wheel 8, edge, i.e., an edge of the tire, rim, etc., against the BIW frame structure 25, the bracket 100 functions to help deflect or rotate wheel 8 in a direction inward and toward the rear blocker 200 and away or perpendicular to the BIW frame structure 25 of the body 7 of the vehicle 1 during a frontal impact or other load that causes the wheel 8 to move toward the bracket 100. The ability to help the wheel 8 rotate further reduces the wheel load transferred to the BIW frame structure 25 by distributing the load input over a larger surface area of the side of the wheel 8 as opposed to the smaller surface are of the wheel 8. Accordingly, when the wheel 8 is rotated or deflected by the bracket 100, a lower potential force remains and may be distributed among the rear blocker 200 and the BIW frame structure 25, including potentially the hinge pillar 28 and the rocker 27 which may now receive a reduced amount of force and a reduced amount of potential intrusion.

With reference to FIG. 8, the bracket 100 may include a body 113, a reinforcement member 114, and adhesive 120. The body 113 of the bracket 100 may be designed as a generally molded, plastic device including the primary exterior surface 101 that may be smooth and free of significant undulations or disruptions and may preferably be designed so that the primary exterior surface 101, once the bracket 100 is installed on the vehicle 1, may be aligned to help the wheel 8 rotate to cross-car direction during an offset, frontal impact to avoid embedding the wheel 8 edge against the BIW frame structure 25 of the body 7 of the vehicle 1.

Referring in particular to FIGS. 6-8, in one exemplary embodiment of the present disclosure, the body 113 of the bracket 100 includes a first portion 102, a second portion 103, and an intermediate portion 104 extending from the first portion 102 to the second portion 103. The bracket 100 defines a channel 122 defined between the first portion 102 and the second portion 103. The channel 122 receives the flange 35.

The bracket 100 presents a back side 112, shown in FIGS. 7 and 8, and a front side 121, shown in FIGS. 4 and 6, opposite the back side 112. The back side 112 and the front side 121 each extend along both the first portion 102 and the second portion 103. The back side 112 faces the vehicle body 7, e.g., the flange 35. The adhesive 120 is disposed on the back side 112.

The rear blocker 200 extends from the frame 10 toward the bracket 100. The bracket defines a cut-out 123 receiving the rear blocker 200, as shown in FIG. 4. Specifically, the first portion 102 is longer than the second portion 103 along the channel 122.

In one exemplary embodiment as shown in the figures, the intermediate portion 104 may have a generally u-shaped configuration about the channel 122, but may alternatively have a v-shaped configuration or hat-shaped configuration as may be appropriate for receiving the flange 35 formed by the ends 31, 33 of the bulkhead 30 and hinge pillar 28, respectively, and for properly coupling the bracket 100 to the BIW frame structure 25 of the vehicle 1.

The body 113 of the bracket 100 may include a lower portion 105 and an upper portion 106. The intermediate portion 104 may extend along both the lower portion 105 and the upper portion 106. In one exemplary embodiment of the present disclosure, the upper portion 106 of the bracket 100 includes a first angular upper surface 108 extending along the first portion 102 and a second angular upper surface 109 extending along the second portion 103. Further, the first angular upper surface 108 and the second angular upper surface 109 each generally extend outwardly from the intermediate portion 104, as best shown in FIGS. 6-8.

Referring in particular to FIG. 6, the primary exterior surface 101 extends downward from the first angular upper surface 108 and outward from the intermediate portion 104 and over the first portion 102 and defines a greater thickness for the first portion 102 than the second portion 103. In other words, the first portion 102 is thicker than the second portion 103 between the front side 121 and the back side 112.

The body 113 of the bracket 100 includes a transition surface 111 on the front side 121 aligned over the intermediate portion 104 and extending from the first portion 102 and toward the second portion 103. The transition surface 111 slopes inwardly from the first portion 102 to the second portion 103 for deflecting the wheel 8 away from the flange 35 during an offset impact. In other words, the transition surface 111 slopes in a car-rearward direction, i.e., away from the wheel 8. During an offset impact, the wheel 8 may be forced against the primary exterior surface 101 and/or the transition surface 111, in which case, the inward slope of the transition surface 111 directs the wheel 8 toward the second portion 103 and the rear blocker 200.

As set forth above, the bracket 100 may include the reinforcement member 114. The reinforcement member 114 may extend along the channel 122 and may be disposed in the channel 122. The reinforcement member 114 receives the flange 35, as best shown in FIG. 5. The reinforcement member may have a shape generally complementing the shape of the intermediate portion 104 of the body 113 of the bracket 100. The reinforcement member 114 may help to divert or deflect forces away from flange 35 formed by the ends 31 and 33. The reinforcement member 114 may be made from a metal material, such as steel or aluminum or other appropriate material. The reinforcement member 114 may extend from one end to the other end, i.e., from the top to the bottom, of the intermediate portion 104 of the body 113. The reinforcement member 114 and the intermediate portion 104 may encapsulate the ends 31 and 33 of the bulkhead 30 and the hinge pillar 28, respectively, to help prevent the welds and/or rivets coupling the aluminum structures of the BIW frame 25 from premature or early failure due to higher loads associated with a front offset impact to the vehicle 1.

The reinforcement member 114 may be fixed to the body 113. For example, the reinforcement member 114 may be overmolded over the body 113. Alternatively, for example, the reinforcement member 114 may be adhered to the body 113, fastened to the body 113 with fasteners (not shown), trapped between the adhesive 120 and the body 113, etc.

The adhesive 120 may be applied or coated on a back side 112 of the body 113 of the bracket 100. The adhesive 120 is disposed between the body 113 of the bracket 100 and the body 7.

The body 113 may define a track 118, as shown in FIGS. 7 and 8, for receiving the adhesive 120. The track 118 is defined on the back side 112 of the body 113. The track 118 assists in properly positioning the adhesive 120 on the body 113.

In one particular exemplar embodiment of the present disclosure, the adhesive 120 may be heat-activated such that the adhesive 120 expands and activates to provide at least added structural coupling the bracket 100 to the BIW frame structure 25. In this embodiment, the bracket 100 is coupled to flange 35 before the BIW frame structure 25 is introduced into a paint oven used in the painting process for the BIW frame. When introduced into the paint oven, the heat of the paint oven activates the adhesive 120 to adhere the body 113 to the flange 113. When of the heat activated type, the adhesive 120 may be retained on the body 113 prior to heat activation in any suitable fashion, e.g., adhering, fastening, etc.

Clips 115, as shown in FIG. 7, may extend from the body 113, and the BIW frame structure 25 may define holes 116, as shown in FIG. 6. The holes 116 may receive the clips 115 when the bracket 100 is engaged with the BIW frame structure 25. The engagement of the clips 115 in the holes 116 may assist in retaining the bracket 100 on the BIW frame structure 25 while the body 113 is adhered to the BIW frame structure 25, e.g., before the adhesive 120 is heat activated by the paint oven as discussed above. In addition to, or in the alternative to, the clips 115 and holes 116, the bracket 100 may be retained to the BIW frame structure 25 with a fastener 117, as shown in FIG. 6. The fastener 117 may be, for example, of the type referred to as a Christmas tree fastener as shown in FIG. 6. The body 113 may define a hole 119 that receives and supports the fastener 117. The bracket 100 may alternatively include any suitable type or number of fasteners 117. The body 113 of the bracket 100 may be partially, temporarily or permanently coupled or joined to the body-in-white frame structure 25 using any known or appropriate coupling devices, fasteners or other couplers alone, or in combination with the adhesive 120.

In one exemplary embodiment, the bracket 100 of the present disclosure may be more readily designed to accommodate new and existing vehicle platforms and may be designed to accommodate other surrounding or mating components of the vehicle 1, including the other components and aspects of the BIW frame structure 25.

The bracket 100 may also help manage the impact of the wheel 8 into the body 7 by providing a generally, smooth exterior surface 101 to allow and to help facilitate the rotation of the wheel 8 away from the body 7 of the vehicle 1. More particularly, the bracket 100 may facilitate the rotation of the wheel 8 away from the body 7 of the vehicle 1 and toward the rear blocker 200, which functions to transfer the loads and forces of the wheel 8 into the frame 10 of the vehicle 1 and thereby further limit the progress of the wheel 8 toward the body 7 of the vehicle 1 during the frontal impact—particularly those experienced during a small offset rigid barrier impact such as represented by the SORB test.

As noted above, in one exemplary embodiment of the present disclosure, the bracket 100 is designed so that the rotation of the wheel 8 is preferably as near as possible to a ninety degree (90°) angle to the hinge pillar 28 and the rocker 27 of the vehicle 1 (and thereby the body 7) to help distribute the impact loads and forces of the wheel 8 over a larger area and may help reduce and/or minimize a point load to the BIW frame 25 of the vehicle 1. The bracket 100 may also significantly reduce assembly plant tooling and complexity by being capable of being assembled with push pin (e.g., one-way or "Christmas-tree") or other bolted fasteners (not shown). In one particular exemplary embodiment of the present disclosure, the bracket 100 may also be used in conjunction with an appropriate grade of structural adhesive to further enhances its strength in compression, shear or peel loading as may be seen by the wheel.

Referring now in particular to FIGS. 2-4, the rear blocker 200 may include a base member 210 coupled (e.g., by welding) to the frame rail 11 at the hole 41. The rear blocker 200 may include an extension member 230 coupled to the base member 210 and extending in a direction to avoid interfering with the envelope of the wheel 8 defined by the movement of the wheel 8 during normal operation of the vehicle 1. The extension member 230 may be a generally rectangular or square cross-section tubular shaped member including a passage extending from a first end to a second end. The extension member 230 has a generally longitudinal extent including a longitudinal axis. The extension member 230 may include a first portion angularly offset from a second portion. The sizes and angles of the first and second portions may be preferably selected to locate the second blocker structure 200 proximal the envelope of the wheel 8 and so the end of the blocker structure 200 extends toward and is located proximal the bracket 100 when installed on the vehicle 1 so that the rear blocker 200 is engaged by the wheel 8 due to a frontal impact to the vehicle 1 causing the wheel 8 to be deflected by the surfaces 101, 111 of the bracket 100 and toward the rear blocker 200, which then manages the forces of the impact being transferred by the wheel 8 toward in the frame rail 11 and thereby helps to limit and/or prevent the movement of the wheel 8 toward the passenger compartment 5 of the body 7.

It is understood that the present description is intended to be illustrative and not restrictive. Many embodiments as well as many applications besides the examples provided will be apparent to those of skill in the art upon understanding the present disclosure. The scope of the claimed invention should, therefore, not be determined with limiting reference to the description, but should instead be determined with reference to the appended claims, along with the full scope of equivalents to which the claims are entitled. Any disclosure of an article or reference, including patent applications and publications, is incorporated by reference herein for all purposes. Any omission in the following claims of any aspect of subject matter disclosed herein is not a disclaimer of such subject matter.

The invention claimed is:

1. A vehicle body assembly comprising:
a vehicle body presenting a flange; and
a bracket including a first portion, a second portion, and a channel defined between the first and second portion and receiving the flange;
the bracket presenting a back side facing the flange and a front side opposite the back side; and
the bracket including a transition surface on the front side sloping inwardly from the first portion to the second portion;
wherein the vehicle body includes a hinge pillar and a bulkhead, and the flange is defined by the hinge pillar and the bulkhead.

2. The vehicle body assembly as set forth in claim 1 further comprising a frame spaced from the bracket and a rear blocker extending from the frame toward the bracket.

3. The vehicle body assembly as set forth in claim 2 wherein the bracket defines a cut-out receiving the rear blocker.

4. The vehicle body assembly as set forth in claim 1 wherein the first portion is thicker than the second portion between the front side and the back side.

5. The vehicle body assembly as set forth in claim 1 wherein the vehicle body defines a hole and the bracket supports a fastener engaged with the hole.

6. The vehicle body assembly as set forth in claim 1 further comprising adhesive disposed between the bracket and the vehicle body.

7. The vehicle body assembly as set forth in claim 6 wherein the adhesive is heat-activated adhesive.

8. The vehicle body assembly as set forth in claim 1 wherein the bracket includes a reinforcement member along the channel.

9. The vehicle body assembly as set forth in claim 8 wherein the reinforcement member receives the flange.

10. A bracket for protecting a flange of a body of a vehicle, the bracket comprising:
a first portion, a second portion, and a channel defined between the first and second portions for receiving the flange;
a back side and adhesive disposed on the back side;
a front side opposite the back side; and
a transition surface on the front side sloping inwardly from the first portion to the second portion for deflecting a wheel away from the flange during an offset impact.

11. The bracket as set forth in claim 10 further comprising a reinforcement member along the channel.

12. The bracket as set forth in claim 11 wherein the reinforcement member is U-shaped.

13. The bracket as set forth in claim 10 wherein the first portion is thicker than the second portion between the front side and the back side.

14. The bracket as set forth in claim 10 wherein the first portion is longer than the second portion along the channel.

15. The bracket as set forth in claim 10 wherein the back side extends along first portion and second portion.

16. The bracket as set forth in claim 10 wherein the adhesive is heat-activated adhesive.

17. The bracket as set forth in claim 10 wherein the back side define s a track receiving the adhesive.

18. The bracket as set forth in claim 10 further comprising a hole extending through the front side and the back side, and a fastener extending through the hole.

* * * * *